July 19, 1949.  G. A. SPENCER  2,476,830

METHOD OF FORMING FINE FILAMENTS

Filed Dec. 5, 1946

INVENTOR
GEORGE A. SPENCER

BY

ATTORNEYS

Patented July 19, 1949

2,476,830

UNITED STATES PATENT OFFICE

2,476,830

METHOD OF FORMING FINE FILAMENTS

George A. Spencer, Akron, Ohio, assignor to The Firestone Tire & Rubber Company, Akron, Ohio, a corporation of Ohio Application December 5, 1946, Serial No. 714,188

2 Claims. (Cl. 18—54)

This invention relates to the production of fine filaments and other articles from synthetic materials, especially to the production of small continuous articles by a drawing, or mechanical working operation.

Heretofore various types of methods have been proposed for the production of fine filaments from synthetic resinous materials. Most of such filament-forming methods comprise the general actions of heating the resins to plasticize them and give them sufficient fluidity so that they can be extruded through small die apertures. Thereafter, such filaments usually are cooled and then stretched to produce a strong filament of the desired thread diameter. It has been difficult to form threads or filaments of uniform diameters by these previously practiced methods. Also, the synthetic resins tend to break down chemically when rendered sufficiently fluid for extrusion through small orifices since such fluidity is dependent upon the material being raised to a high temperature.

The general object of the present invention is to avoid and overcome the difficulties attendant prior methods of filament formation and to provide a positive action filament forming method whereby a uniform diameter filament is obtained.

Another object of the invention is to provide an easily practiced, inexpensive method of forming fine filaments.

Another object of the invention is to provide a filament forming method which uses a minimum of apparatus, all of which is of substantially standard, uncomplicated construction.

A further object of the invention is to form small diameter filaments from rods of thermoplastic material by mechanically working same.

Figure 1:
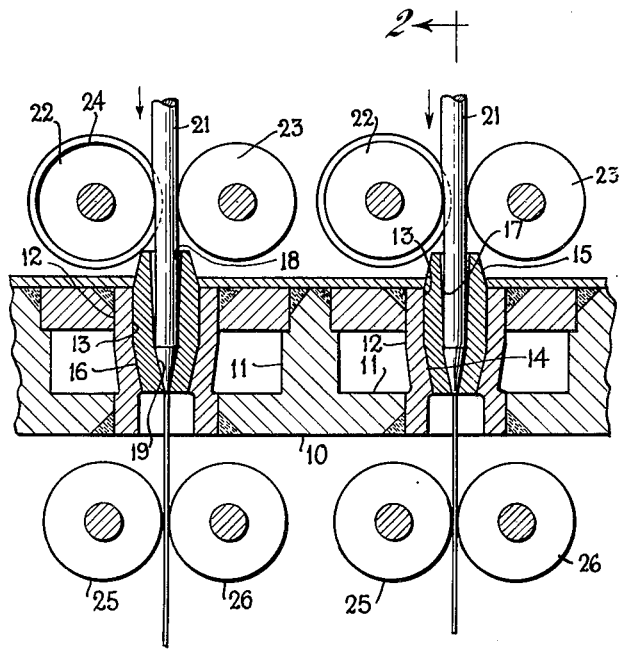
Figure 2:
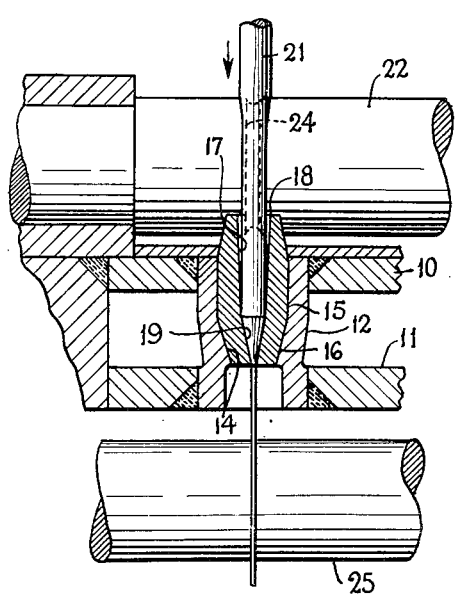

Referring now to the accompanying drawings, wherein:

Fig. 1 is a longitudinal section through apparatus used in practicing the principles of my invention; and Fig. 2 is a section taken on line 2—2 of Fig. 1.

Now, referring specifically to the details of the construction shown in the drawings, a die holder member 10 is provided that has a plurality of annular chambers 11 formed therein, each of which is positioned around a tubular die holding member 12 that may be permanently engaged with the die holder in any suitable manner. This die holding member 12 has a bore 13 which has a conical section 14 formed therein for receipt and positioning of a die member 15. This die 15 is of tubular contour and has a conical end 16 which is adapted to seat on the conical section 14 of the die holding member 12. Any suitable means (not shown) may be provided to secure the die 15 fixedly in the die holding member, although such external means may not be required inasmuch as the die 15 is snugly received in the die holding member 12.

In order to form reduced section articles by passing the articles through the die 15, it is provided with a bore 17 which has an enlarged receiving end 18 and an inwardly tapered shaping or drawing end 19 which tapers inwardly toward the exit end of the die, as shown in Fig. 1 of the drawings. This die 15 is, of course, provided of such size as to perform a desired diameter reduction on any article passing therethrough.

Rods 21, which are formed of a suitable thermoplastic, crystalline, filament forming material, such as polymers of vinylidene chloride and copolymers of large quantities of it with substances such as vinyl chloride or vinyl acetate are processed in the dies 15. One suitable composition for forming the rods 21 is that sold under the name of "Saran" by the Dow Chemical Company. This material comprises from between 5 to 15% vinyl chloride and between 85 to 95% vinylidene chloride. Usually small amounts of suitable plasticizers or other compounding materials are included in the composition being processed. Substantially the same composition as Saran is also sold in fabricated form under the name of "Velon" by The Firestone Tire & Rubber Company. These rods 21 are formed in any desired manner and when received adjacent the die holder 10, may be of a diameter of, say, .010 to .150", and then by being forced through the die 15, the rods 21 are caused to elongate appreciably to take an external diameter at such time of about .005 to .015". However, larger sized articles such as rods, bars, blooms or, possibly, tubing can be similarly processed and reduced by apparatus embodying the principles of the invention, when desired.

The primary feature of the present invention is that pairs of rolls 22 and 23 are provided immediately adjacent the entrance end of each of the dies 15 and that such rolls engage with and grip on the rod 21. Then one or both of the rolls 22 and 23 are driven at a suitable surface speed so that the rod 21 is forced to flow smoothly through the die 15. If desired, the rods 21 may be slightly preheated in any suitable manner, such as by high frequency electrical currents or by infra-red heat lamps, to assume a somewhat plastic condition, so as to be more easily formed or reduced in diameter by the dies. Such warm-up temperature for the rod 21 may be about 125 to 175° F., but must not soften the rod so as to prevent transmittal of compressive forces therethrough. In some instances, it is desirable to form batteries of dies in the die holder 10, or other similar die holders may be provided adjacent die holder 10. Then the rolls 22 and 23 may be cylindrical in shape and extend between several of such die holders. Recesses 24 are provided in the rolls 22 at proper locations to engage with the rods 21 to aid in gripping and reducing the rods by the rolls 22 and 23.

While the accompanying drawings show several aligned sets of rolls 22 and 23, it will be realized that only one pair of such rolls are required for practice of the invention and that such rolls may have one or more rods 21 fed thereto, dependent upon the desired production conditions, and the number of dies to be used.

Sometimes it may be necessary to facilitate or help the rods 21 to flow or be forced through the dies 13. Thus other pairs of rolls 25 and 26 may be provided immediately adjacent the exit or forming end of the dies 15. Such rolls 25 and 26 then are driven at a suitable speed by any desired means so that their peripheral speed is sufficiently greater than that of the rolls 22 and 23 to compensate for the greatly increased length of the rod 21 due to its elongation by one of the dies 15.

In cold forming the material of the invention into fine filaments, the material normally will be supplied to the dies in an amorphous (and usually supercooled) condition, but the cold working and stretching of such material will effect crystallization of the material so as to cause the crystals formed to extend parallel to the axis of the material being processed. This effects an "orientation" of the material and greatly increases its tensile strength. When required, a suitable lubricant may be applied to the dies and a coolant may be circulated around them in a conventional manner. The dies 15 must be made from a material which is not reactive with the material being processed, and nickel is one material that is suitable for use with Saran.

As a modification of the invention, it may be desirable to pass the rods 21 through a plurality of sets of rolls and dies to reduce the rod diameter in a series of rolling and drawing operations. The rods in such cases then may require an intermediate processing, such as being heated to a temperature at least near their fusing temperature between successive drawing operations, and thereafter they may be quenched to make the material forming the rods amorphous. As the rolls 22 and 23 must engage with the rods 21 to push them through the dies, such rolls must in turn compress the rods 21 slightly and effect partial reduction in their diameters. Normally the majority of the reduction in diameter of the rods 21 at each "roll stand" is caused by the forming action of the dies 15.

Sometimes it may be desirable to omit the dies 15 and use only pairs of rolls as the rolls 22 and 23, to work and reduce the diameter of the thermoplastic rods mechanically, since such reduction will form a smooth, uniform diameter filament. In such instances, it may be desirable to form grooves, like the grooves 24 in each roll, rather than only in one roll, as shown.

Yet another possibility is that the rolls 22 and 23 be omitted, and the rods 21 would be drawn through the dies 15 by the rolls 25 and 26. This action, of course, as could all of the process of the invention, could be performed in a plurality of stages with a preliminary heating action and intermediate annealing and quenching steps, as desired. Also, the rolls 22 and 23 in this case may be grooved like the rolls 22 to facilitate their engagement with the rods 21 and to prevent the rolls from flattening the rod or other article being processed.

From the foregoing, it will be seen that several positive filament forming and article reducing and elongating methods have been provided by the invention and that uniform diameter filaments and articles can readily be obtained by practice of the invention.

The invention is applicable to and usable with, in general, the resinous crystalline, orientable polymers and copolymers of vinylidene chloride or 2,3-dichlorobutadiene-1,3. Relatively large quantities of such materials can be copolymerized with minor proportions of other unsaturated compounds such as the vinyl esters on the order of vinyl chloride, vinyl bromide, vinyl acetate, vinyl butyrate, vinyl stearate and the like; vinyl ethers and ketones, such as vinyl isobutyl ether and vinyl ethyl ketone; vinylidene chloride (for dichlorobutadiene); cyclic substituted unsaturated compounds such as styrene, indene, coumarone and the like; conjugated unsaturated compounds such as butadiene, isoprene and the like; and other compounds such as acrylonitrile, and the like. Dichlorobutadiene should be polymerized in the presence of modifiers such as 1 or 2% of amylmercaptan to avoid obtaining an insoluble and infusible product.

In accordance with the patent statutes, one complete embodiment for practicing the principles of the invention has been described in detail herein; however, it will be seen that the scope of the invention is not limited to the example set forth herein, but that it is defined in the appended claims.

What is claimed is:

1. That method of forming fine filaments from resins selected from the group consisting of crystalline thermoplastic polymers and copolymers of vinylidene chloride comprising the steps of forming a continuous rod of such resin, said rod being in an amorphous, supercooled condition, heating said rod to plasticize it, gripping said rod at its sides in the nip of a pair of rolls and revolving said rolls so as to force the rod toward and through an opening of diameter less than the diameter of said rod to form a filament of uniform diameter therefrom, and aiding in the reduction of the rod by drawing it through such opening.

2. That method of forming fine filaments from crystalline thermoplastic copolymers of from 5 to 15% of vinyl chloride with from 95 to 85% of vinylidene chloride, comprising the steps of forming a continuous rod of such resin, such rod being in an amorphous supercooled condition, heating said rod to from 125° F. to 175° F. to plasticize the same, gripping said rod at its sides in the nip of a pair of rolls and revolving said rolls so as to force said rod toward and through an opening of diameter less than the diameter of said rod to form a filament of uniform diameter therefrom, and aiding in the reduction of the rod by drawing it through such opening.

GEORGE A. SPENCER.

REFERENCES CITED

The following references are of record in the file of this patent:

UNITED STATES PATENTS

| Number | Name | Date |
| --- | --- | --- |
| 2,183,602 | Wiley | Dec. 19, 1939 |
| 2,244,208 | Miles | June 3, 1941 |
| 2,348,772 | Wiley | May 16, 1944 |

FOREIGN PATENTS

| Number | Country | Date |
| --- | --- | --- |
| 156,202 | Great Britain | July 1921 |
| 541,724 | Great Britain | Dec. 9, 1941 |
| 225,959 | Switzerland | June 1, 1943 |